Aug. 7, 1923.

J. BARNA 1,463,788

STORAGE BATTERY PLATE

Filed Jan. 6, 1923  2 Sheets-Sheet 1

Inventor
John Barna,
By L. B. James
Attorney

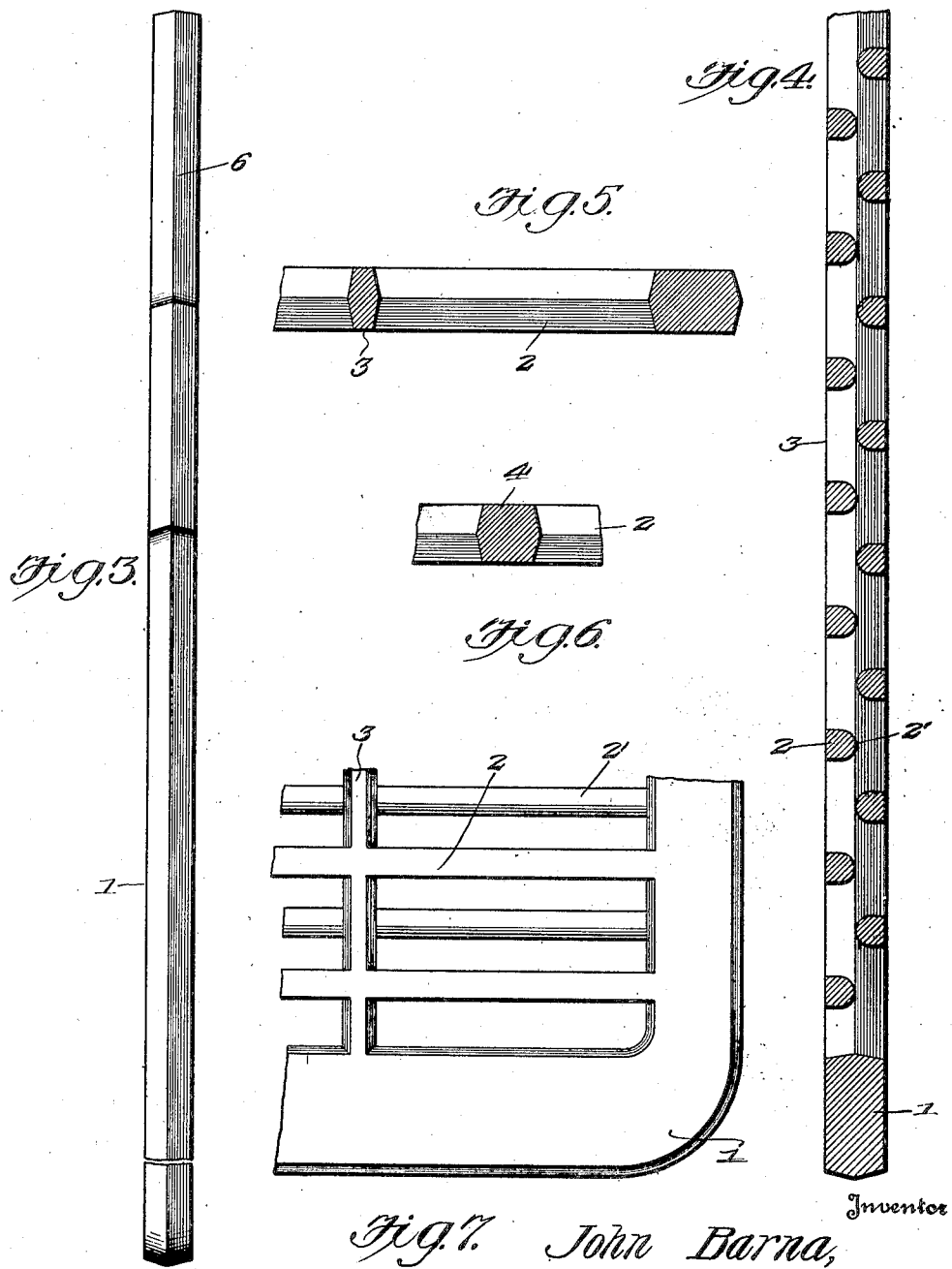

Patented Aug. 7, 1923.

1,463,788

UNITED STATES PATENT OFFICE.

JOHN BARNA, OF NEW LONDON, CONNECTICUT.

STORAGE-BATTERY PLATE.

Application filed January 6, 1923. Serial No. 611,190.

*To all whom it may concern:*

Be it known that I, JOHN BARNA, a citizen of the United States, residing at New London, in the county of New London and State of Connecticut, have invented new and useful Improvements in Storage-Battery Plates, of which the following is a specification.

This invention relates to improvements in batteries, the general object of the invention being to provide a grid plate which will have greater strength than the plates as now made and which can be manufactured to sell at low cost.

Another object of the invention is to provide means to prevent the heat from warping the plate when the battery is being charged or discharged.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 3 is a side edge view.

Fig. 4 is a section on line 4—4 of Fig. 1.

Fig. 5 is a section on line 5—5 of Fig. 1.

Fig. 6 is a section on line 6—6 of Fig. 1.

Fig. 7 is an enlarged view of one corner of the plate.

Figure 1:
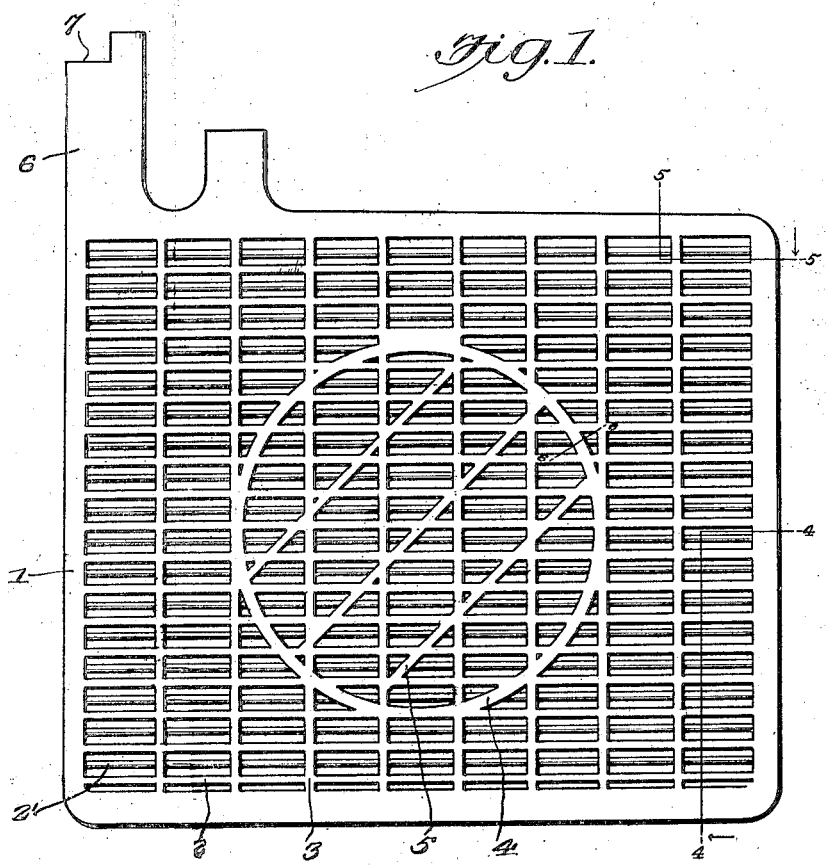
Figure 1 is a side view of the improved plate.
Figure 2:
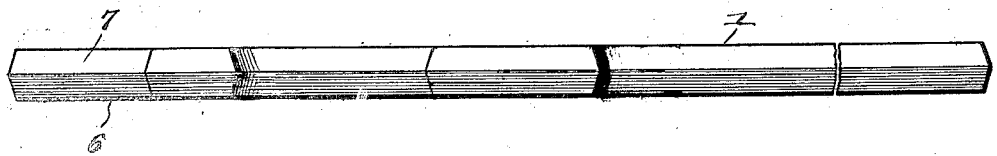
Fig. 2 is a top edge view.

In these views 1 indicates the frame of the plate, 2 the horizontal bars and 3 the vertical bars. As shown, the bars 2 are staggered with their inner edges extending to the center of the frame and these edges are rounded as shown at 2′. The vertical bars 3 taper from their centers towards their edges so that these bars are of substantially diamond shape in cross section. The inner edges of the frame are of similar shape. The plate is formed with a circular rib 4 at its center which is of the same cross sectional shape as the bars 3 and inclined ribs 5 are arranged in the circle. The terminal lug 6 is stepped, as at 7, for receiving a lead strip.

From the foregoing it will be seen that a grid plate is produced which has great strength yet one which can be cheaply manufactured. The staggered horizontal ribs or bars provide ample space for the active material and the peculiar form of these gives them great strength and enables the plate to stand charging and discharging to fifty amperes without warping. The circular rib and its bracing ribs will take up the heat in the plate and will prevent warping and pulling in from the corners when the battery is being charged or discharged in excess of thirty amperes.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A grid plate for a battery comprising a frame, vertical and horizontal ribs therein and a circular rib at the center of the plate.

2. A grid plate for a battery comprising a frame, vertical and horizontal ribs therein and a circular rib at the center of the plate and inclined bracing means in the circular rib.

3. A grid plate for a battery comprising a frame, horizontal ribs of half the thickness of the frame with their inner edges in alignment, the ribs on one side being alternately arranged with respect to the ribs on the other side and the inner edges of said ribs being rounded, vertical ribs, a circular rib in the middle of the plate, inclined bracing ribs in the circular rib and a stepped terminal for the plate.

In testimony whereof I affix my signature.

JOHN BARNA.